(12) United States Patent
Scelsi et al.

(10) Patent No.: US 10,073,445 B2
(45) Date of Patent: Sep. 11, 2018

(54) QUALITY CONTROL SYSTEM AND METHOD

(71) Applicant: Honda Motor Co., Ltd., Minato-ku, Tokyo (JP)

(72) Inventors: John M. Scelsi, Moody, AL (US); Brian G. Jones, Talladega, AL (US)

(73) Assignee: Honda Motor Co., Ltd., Tokyo (JP)

(*) Notice: Subject to any disclaimer, the term of this patent is extended or adjusted under 35 U.S.C. 154(b) by 1050 days.

(21) Appl. No.: 14/095,070

(22) Filed: Dec. 3, 2013

(65) Prior Publication Data
US 2015/0153732 A1    Jun. 4, 2015

(51) Int. Cl.
*G06F 17/00* (2006.01)
*G05B 19/418* (2006.01)
*G05B 23/02* (2006.01)

(52) U.S. Cl.
CPC ... *G05B 19/41875* (2013.01); *G05B 23/0205* (2013.01); *G05B 2219/32228* (2013.01); *G05B 2219/32237* (2013.01); *G05B 2219/35193* (2013.01); *G05B 2219/37207* (2013.01); *Y02P 90/22* (2015.11); *Y02P 90/265* (2015.11); *Y10T 29/49829* (2015.01); *Y10T 29/53013* (2015.01)

(58) Field of Classification Search
CPC .. G05B 23/0227; G05B 23/823; G05B 23/02; G05B 2219/35013; G05B 19/41875; G06F 17/00; B23P 19/04; Y02P 90/22
USPC .................................................. 702/182–185
See application file for complete search history.

(56) References Cited

U.S. PATENT DOCUMENTS

| | | | |
|---|---|---|---|
| 4,815,190 A | 3/1989 | Haba, Jr. et al. | |
| 5,353,230 A | 10/1994 | Maejima et al. | |
| 5,917,726 A | 6/1999 | Pryor | |
| 6,314,631 B1 | 11/2001 | Pryor | |
| 6,324,749 B1 | 12/2001 | Katsuura et al. | |
| 6,580,971 B2 | 6/2003 | Bunn et al. | |
| 6,662,064 B2 | 12/2003 | Vollmar et al. | |
| 6,763,564 B2 | 7/2004 | Ilies | |
| 7,162,320 B2 | 1/2007 | Derson et al. | |
| 7,269,900 B2 | 9/2007 | Moriya et al. | |
| 7,587,804 B2 | 9/2009 | Steinhilper et al. | |
| 7,815,036 B2 | 10/2010 | Spangler et al. | |
| 8,108,061 B2 * | 1/2012 | Lee .................. | G05B 19/41875 700/109 |

(Continued)

*Primary Examiner* — Sujoy Kundu
*Assistant Examiner* — Lynda Dinh
(74) *Attorney, Agent, or Firm* — Arent Fox LLP (57) ABSTRACT

A system and method of operating an assembly line for performing an assembly operation on an article. The method includes the steps of detecting an absence or presence of an abnormality in the article and classifying the abnormality as one of a plurality of types including a first type of abnormality and a second type of abnormality. Additionally, the method includes the step of determining that the article is eligible for the assembly operation if at least the abnormality is detected as present and the abnormality is the first type of abnormality. Moreover, the method includes the step of determining that the article is eligible for the assembly operation if at least the abnormality is detected as present, the abnormality is the second type of abnormality, and an override command is received. Furthermore, the method includes the step of providing an electronic output if the article is eligibility for assembly.

19 Claims, 2 Drawing Sheets

(56) References Cited

U.S. PATENT DOCUMENTS

2007/0004381 A1* 1/2007 Larson .................... G06F 21/35
455/411

* cited by examiner

QUALITY CONTROL SYSTEM AND METHOD

BACKGROUND

The present disclosure relates to assembly line systems and more particularly, but not necessarily exclusively, to automobile assembly line systems.

The manufacture or assembly of articles requires one or more processing stations along a manufacturing or assembly line. Sometimes, an article may have an abnormality, detracting from the quality of the article. Abnormalities are any condition in an article that is undesired. The abnormality may have existed in the article prior to manufacturing or the abnormality may have been created during processing of the article. For example, in the automobile assembly process, a nut on a vehicle may not have been tightened to a sufficient torque value at a particular processing station. Moreover, the nut may have been cross-threaded with a bolt during assembly. Such abnormalities can affect the quality of the vehicle. Additionally, if further processing is performed on the vehicle without first repairing the abnormality, repairing the abnormality after the subsequent processing has been performed can be more challenging than repairing the abnormality prior to the subsequent processing. As such, there is a need for a system and method of executing repairs of abnormalities on an assembly line.

SUMMARY

The following presents a simplified summary of the disclosure in order to provide a basic understanding of some example aspects described in the detailed description.

In one of its aspects, the present disclosure provides a method of operating an assembly line for performing an assembly operation on an article. The method includes the step of detecting an absence or presence of an abnormality in the article. The method further includes the step of classifying the abnormality as one of a plurality of types including a first type of abnormality and a second type of abnormality. Additionally, the method includes the step of determining that the article is eligible for the assembly operation if at least the abnormality is detected as present and the abnormality is the first type of abnormality. Moreover, the method includes the step of determining that the article is eligible for the assembly operation if at least the abnormality is detected as present, the abnormality is the second type of abnormality, and an override command is received. Furthermore, the method includes the step of providing an electronic output if the article is eligibility for assembly.

In another aspect of the present disclosure there is provided an assembly line system for performing an assembly operation on an article. The system includes an inspection device configured to communicate a presence or absence of an abnormality in the article to a controller, the abnormality being one of a plurality of types including a first type of abnormality and a second type of abnormality. The controller is configured to selectively provide an output if the controller determines that the article is eligible for the assembly operation. The system further includes an override device in communication with the controller and configured to selectively send an override command to the controller. Upon the condition that the abnormality is communicated as present, the controller is configured to determine that the article is eligible for the assembly operation if at least the abnormality is the first type of abnormality. Upon the condition that the abnormality is communicated as present and the abnormality is the second type of abnormality, the controller is configured to determine that the article is eligible for the assembly operation if at least the controller receives the override command.

In yet another aspect of the present disclosure there is provided an assembly line system for performing an assembly operation on an article. The system includes a plurality of work stations having a first work station and a second work station. The second work station is configured to perform the assembly operation. The first work station includes an inspection device that is configured to communicate a presence or absence of an abnormality in the article to a controller, the abnormality being one of a plurality of types including a first type of abnormality and a second type of abnormality. The controller is configured to selectively provide an output if the controller determines that the article is eligible for the assembly operation. The system further includes an override device in communication with the controller and configured to selectively send an override command to the controller. Upon the condition that the abnormality is communicated as present, the controller is configured to determine that the article is eligible for the assembly operation if at least the abnormality is the first type of abnormality. Upon the condition that the abnormality is communicated as present and the abnormality is the second type of abnormality, the controller is configured to determine that the article is eligible for the assembly operation if at least the controller receives the override command.

BRIEF DESCRIPTION OF THE DRAWINGS

These and other features, aspects and advantages of the present disclosure are better understood when the following detailed description is read with reference to the accompanying drawings, in which.

DETAILED DESCRIPTION

Methods will now be described more fully hereinafter with reference to the accompanying drawings in which example embodiments of the disclosure are shown. Whenever possible, the same reference numerals are used throughout the drawings to refer to the same or like parts. However, this disclosure may be embodied in many different forms and should not be construed as limited to the embodiments set forth herein.

The following disclosure pertains to an assembly line system and method of operating an assembly line system that distinguishes between types of abnormalities encountered in an assembly process to determine whether an article having an abnormality is eligible for a given assembly operation to be performed in the assembly process. Additionally, the system and method further assigns each abnormality a level indicative of the authority a technician must possess to be authorized to repair the abnormality. Different aspects of an assembly process are compartmentalized into zones to reduce the manpower required to troubleshoot and repair the abnormalities as they arise. Technicians can be assigned to monitor zones including a plurality of automated assembly stations, which may eliminate the need to assign a separate technician to monitor each station individually.

Figure 1:
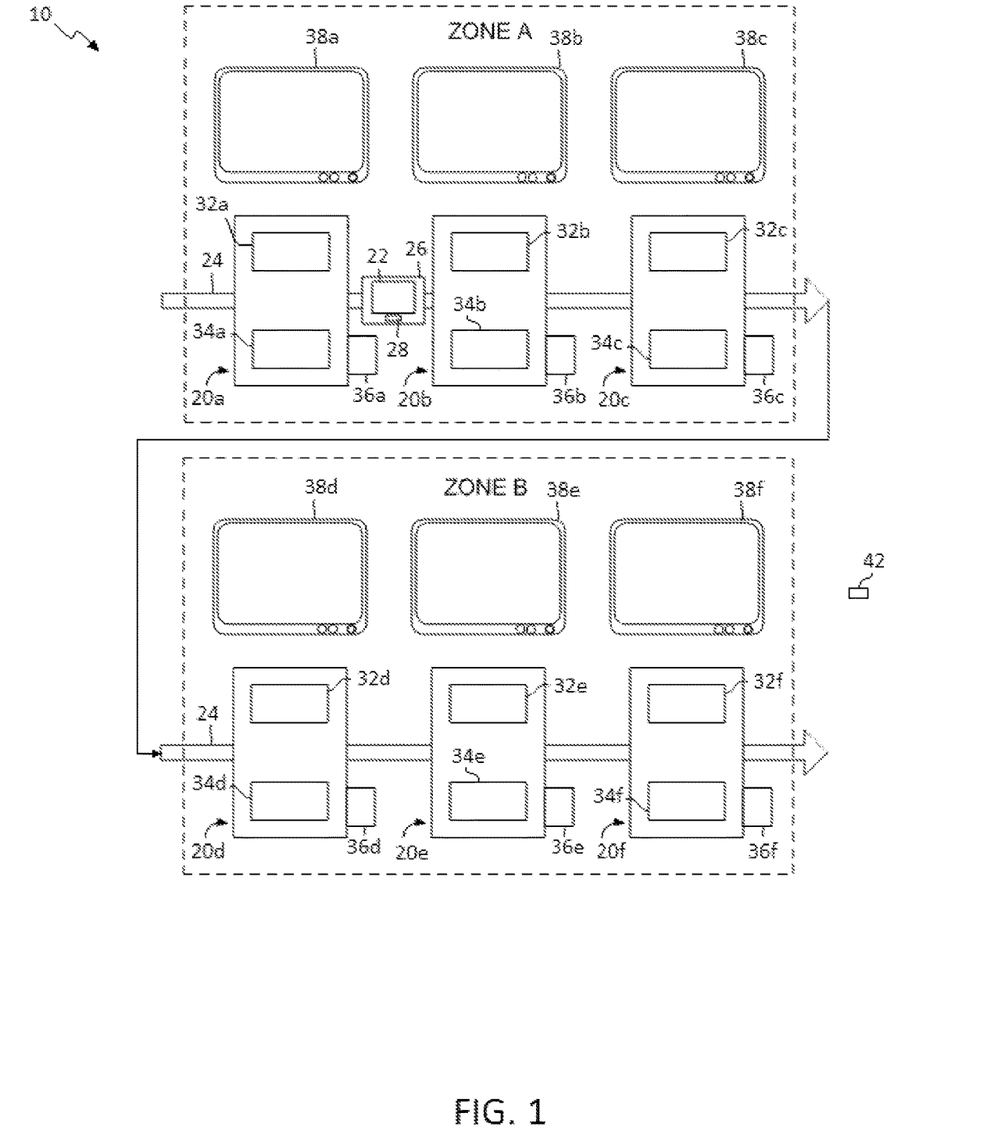
FIG. 1 is a schematic view of an assembly line system according to an embodiment.

Referring to FIG. 1, there is provided an example assembly line system 10. The system 10 is divided into two zones A and B. Each zone A, B is made up of a plurality of work stations 20a-f for performing various assembly operations on an article 22 (e.g., engine) as it travels along an assembly line 24. The assembly operations can include any operation that results in a physical transformation of the article 22. For instance, one of the stations 20a-f may be equipped with a nut runner that is operable to apply a predetermined torque to a nut on the article 22. As another example, one of the stations 20a-f may comprise a machine that is operable to weld a component to the article 22. As yet another example, one of the stations 20a-f may comprise a machine that is operable to apply a layer of adhesive or paint to the article 22. While six work stations 20a-f and two zones A, B are shown and described with reference to FIG. 1, it should be understood that any suitable number of work stations and zones may be provided. Moreover, it should be understood that a single assembly operation or multiple assembly operations may be performed at each work station 20a-f. Additionally, it should be understood that the assembly operations performed at each work station 20a-f may be executed automatically by a machine or manually by an assembly line operator.

The article 22 is supported on a pallet 26 as it travels between the stations 20a-f and zones A, B. A radio-frequency identification (RFID) tag 28 or other computer-readable, memory storage device is applied to the pallet 26 to identify the article 22 and store additional information regarding the article 22. Alternatively, the first RFID tag 28 or other computer-readable, memory storage device could be associated with the article 22 in some other way, for example by directly attaching it to the article 22.

Whether the article 22 is eligible for performance of a particular assembly operation can depend on whether any abnormalities are present in the article 22 and if so, the nature of the abnormalities. When determining whether the article 22 is eligible for a given assembly operation, the present exemplary system 10 classifies abnormalities as being one of a plurality of types including a first type (Type I) of abnormality and a second type (Type II) of abnormality. Type I abnormalities are abnormalities that do not require repair before performance of the assembly operation. Type I abnormalities can include abnormalities that pose minimal risk to successful execution of the assembly operation and whose repair will not be overly complicated by performance of the assembly operation. Thus, repair of such Type I abnormalities before the assembly operation is unnecessary. Type II abnormalities, however, are abnormalities that either require repair before performance of the assembly operation or receipt of an override command from a system operator authorizing the assembly operation to be performed without first repairing the abnormality. Type II abnormalities can include abnormalities whose continuing presence in the article 22 could negatively impact execution of the assembly operation or whose repair may be made more difficult if the assembly operation is performed. Thus, repair of such Type II abnormalities before the assembly operation is desirable.

It should be appreciated that although two types of abnormalities are described above, the system 10 may distinguish between more than two types of abnormalities. For example, the system 10 may classify certain abnormalities as Type III abnormalities, wherein articles having Type III abnormalities can only be assembled if they are first repaired. The present exemplary system 10 may classify abnormalities as being one of any number of types without departing from the scope of the application.

As shown in FIG. 1, each work station 20a-f includes an inspection device 32a-f, a controller 34a-f, a transceiver 36a-f, and a user interface 38a-f. To provide a better understanding of how these features operate, the features specifically relating to station 20a will now be described in further detail. However, it will be understood that the operation of the features of station 20a may similarly apply to the operation of the corresponding features of stations 20b-f.

The inspection device 32a of station 20a is configured to communicate the presence or absence of one or more abnormalities in the article 22 to the controller 34a. For example, the inspection device 32a may include a torque sensor configured to detect an insufficient torque being applied to the nut by a nut runner in station 20a. If the torque sensor detects that the torque applied is insufficient, the inspection device 32a can provide an output to the controller 34a indicating that the torque applied is insufficient. As another example, the inspection device 32a may include a push-button or switch that when actuated by an assembly line operator, provides an output to the controller 34a indicating that an abnormality is present or absent. Thus, the operator can inspect the article 22 for the abnormality and communicate its presence or absence to the controller 34a by actuating the push-button or switch. The inspection device 32a may be configured to communicate the presence or absence of a variety of different abnormalities. For example, the inspection device 32a may be configured to communicate the presence of a timeout condition, a defective weld, a misaligned or missing part, or a defective or incorrect part. The abnormalities communicated by the inspection device 32a may be any condition in the article 22 that is undesirable. Moreover, the inspection device 32a may be configured to communicate abnormalities formed during an assembly process of station 20a or the inspection device 32a may be configured to communicate abnormalities that existed in the article 22 prior to the station's encounter with the article 22.

The controller 34a is configured to determine the eligibility of the article 22 for an assembly operation to be performed at subsequent station 20b. The controller 34a may comprise a system of relays, a programmable logic controller, a central processing unit, or any other device for gathering inputs from and providing outputs to the exemplary system 10. The controller 34a classifies abnormalities as being either a Type I or Type II abnormality and determines accordingly whether the article 22 is eligible for the assembly operation. If an abnormality is communicated as present, the article 22 is eligible for the assembly operation if at least the abnormality is a Type I abnormality. Meanwhile, if the abnormality communicated as present is a Type II abnormality, the article 22 is eligible for the assembly operation if at least a) the abnormality is repaired prior to assembly or b) the controller 34a receives an override command authorizing performance of the assembly operation without first repairing the abnormality. In either case, other conditions may be necessary to satisfy for the article 22 to be eligible for assembly (e.g., station 20b availability). However, repair of the abnormality or receipt of the override command is at least required for eligibility if the detected abnormality is a Type II abnormality while neither is required if the detected abnormality is a Type I abnormality.

It should be appreciated that although the controller 34a in the present system 10 is configured to determine the eligibility of the article 22 for an assembly operation to be performed at subsequent station 20b, the controller 34a may alternatively or additionally be configured to determine the eligibility of the article 22 for an assembly operation to be performed at a different station, for example station 20c. Additionally, the controller 34a may alternatively or additionally be configured to determine the eligibility of the article 22 for an assembly operation to be performed within its own station 20a.

For situations where a Type II abnormality is communicated as present, the user interface 38a allows an operator to update the system 10 with the abnormality's repair status or issue an override command authorizing performance of the assembly operation in station 20b without first repairing the abnormality. The user interface 38a is in communication with the controller 34a and can include a display, monitor, a series of lights, or any other device that will allow the operator to view system conditions, for example the presence of an abnormality. The user interface may be located at the work station or may be any type of portable electronic device that is able to communicate with the controller. Additionally, the user interface can include a keyboard, touchscreen, switches, push-buttons, or any other input device that will allow the operator to provide inputs to the controller 34a such as the repair status of the article 22 or override commands. Thus, the controller 34a can tell whether a Type II abnormality has been repaired or if an override command has been issued and can properly determine whether the article 22 is eligible for the assembly operation in station 20b.

Once the article's eligibility for assembly is determined, the controller 34a is configured to selectively provide an output if the article is eligible for the assembly operation performed in station 20b. The selective output can be used to control the transfer or assembly of the article 22 along the assembly line 24. For example, in the present system 10, the selective output of the controller 34a is used to control the transfer of the article 22 along the assembly line 24 to the subsequent station 20b in the assembly process. The assembly line 24 comprises a conveyor that is in communication with the controller 34a and is configured to deliver the article 22 to the subsequent station 20b upon condition that the article 22 is eligible for the assembly operation performed in the subsequent station 20b. If the article 22 is eligible for the assembly operation, the controller 34a will provide the output to the conveyor. Upon receiving the output from the controller 34a, the conveyor will deliver the article 22 from the station 20a to the subsequent station 20b, at which point a machine within station 20b will recognize the article 22 as present and begin performing the assembly operation. However, if the article 22 is not eligible for performance of the assembly operation, the controller 34a will not provide the output and the article 22 will not be conveyed to the subsequent station 20b. Instead, the article 22 will remain at station 20a or may be diverted to an alternative area (not shown), such as an inspection and repair line or station, for a technician to inspect and/or repair the abnormality.

It should be understood that the term "output" when used in this disclosure is not intended to be limited to the presence of a particular condition. Rather, the absence of a condition can also be an output. For example, the output selectively provided by the controller 34a above may take the form of an electronic signal or the output may be the absence of such a signal. Moreover, although receipt of the output in the present example by the conveyor causes the conveyor to transfer the article 22 to station 20b, the selective output from the controller 34a may be used in variety of different ways to control the article's conveyance or assembly. For instance, the selective output of the controller 32 may be received directly by a machine in station 20b to permit or prohibit performance of the assembly operation by the machine in station 20b. Furthermore, the selective output may be used to permit or prohibit performance of an assembly operation by a machine in a different station in the assembly line 24, for example station 20c. Additionally, the selective output of the controller 34a may be used to permit or prohibit performance of an assembly operation by a machine within its own station 20a. The selective output may be used in a variety of ways to control the article's transfer or assembly without departing from the scope of the application.

The controller 34a may further include a delay for a designated period of time configured to delay the output upon the condition that the inspection device 32a communicates that an abnormality is present and the abnormality is a Type I abnormality. For instances when a Type I abnormality is present, the delay stalls conveyance of the article 22 by the conveyor for the designated period of time, thus holding the article at station 20a. This allows a technician an opportunity to inspect and repair the abnormality prior to the article's conveyance to station 20b. The designated period of time may be the same for all abnormalities or based on the nature of the abnormality. The designated period of time may also be changed manually or automatically, for example, depending based on the frequency or number of abnormalities. Moreover, the technician can issue a pause command using the user interface 32a, which will further delay the output from the controller 34a in case more time is needed for inspection or repair.

The controller 34a can be further configured to designate abnormalities as being one of a plurality of abnormality levels or repair levels including, for example, a first level (Level I) abnormality, a second level (Level II) abnormality, and a third level (Level III) abnormality. A Level I abnormality can be addressed by a simple repair technique such as using a torque wrench to manually apply the desired torque to the nut, and can be performed a technician who has received minimal training. A Level III abnormality falls on the other end of the spectrum, and must generally be addressed by a sophisticated repair process requiring a relatively-high degree of expertise. Accordingly, Level III abnormalities must be repaired only by technicians who are pre-authorized as having the required skillset to perform the sophisticated repair process required. Abnormalities classified as Level II abnormalities require repairs by a technician having a skillset between that of the technicians required to repair the Level I and Level III abnormalities.

Technicians under the present exemplary system 10 are classified as being one of a plurality of technician levels including a first level (Level I) technician, a second level (Level II) technician, and a third level (Level III) technician. Level I technicians are authorized to repair Level I abnormalities, Level II technicians are authorized to repair both Level I and Level II abnormalities, and Level III technicians are authorized to repair Level I, Level II, and Level III abnormalities. In this example, while technicians of a certain level are authorized to repair abnormalities belonging to their level and levels below their level, technicians are not authorized to repair abnormalities belonging to levels that are above their level.

In addition to providing authorization for repairs of abnormalities, the levels described above can also be used to provide authorization to technicians for issuing override commands. For example, technicians of a certain level can be authorized to issue override commands for abnormalities belonging to their level and levels below their level. Meanwhile, technicians can be unauthorized to issue override commands for abnormalities belonging to levels that are above their level. Moreover, it should be appreciated that although the present exemplary system 10 defines three distinct levels for abnormalities and technicians, the number of levels can vary without departing from the scope of the application. For example, some systems may only have two levels while other systems can have more than three levels. Moreover, the scope of abnormalities that belong to each level may vary between different embodiments.

The transceiver 36a is in communication with the controller 34a and is configured to access information stored by the first RFID tag 28 on the pallet 26 and update the information to include the nature of the abnormality. The first RFID tag 28 can store information indicating the presence or absence of an abnormality in the article 22, the abnormality's designation as a Type I or Type II abnormality, and the abnormality's designation as a Level I, Level II, or Level III abnormality. Thus, the transceivers 36b-f of stations 20b-f that are subsequent in the assembly process are able to access the updated information and relay the information to the controllers 34b-f so the controllers 34b-f can determine if any of the abnormalities communicated by the inspection device 32a of station 20a will affect the article's eligibility for other assembly operations.

The system 10 can further include a second RFID tag 42 or other memory storage device that is configured to store information indicating the identity of a given technician and the technician's designation Level I, Level II, or Level III technician. The second RFID tag 42 can be part of a badge worn by the technician when operating or servicing the system 10. When the technician approaches the station 20a to perform a repair on the article 22 or issue an override command, the second RFID tag 42 can be interrogated (read) by the transceiver 36a. The transceiver 36a can then update the stored information on the first RFID tag 28 on the pallet 26 to include the identity and authorization level of the technician. Moreover, the controller 34a is configured to issue an alert if the information read by the transceiver 36a indicates that the technician is not authorized to repair the article 22 or issue the override command. Once the repair is completed, the transceiver 36a can update the stored information on the first RFID tag 28 to indicate the repair has been updated.

As mentioned above, operation of the features of station 20a may similarly apply to the operation of the corresponding features of stations 20b-f. For example, the controller 34b of station 20b may be configured to determine the eligibility of the article for an assembly operation to be performed at station 20c. Moreover, repair of an abnormality present in the article 22 or receipt of an override command may similarly be required for eligibility if the abnormality is a Type II abnormality while neither may be required if the abnormality is a Type I abnormality. However, the operation of the corresponding features need not be similar. For instance, in the present example, the requirements for eligibility of article 22 for assembly in station 20d are different. Station 20c is the last station in Zone A while station 20d is the first station in Zone B. The present exemplary system 10 is configured such that once an article 22 is finished with processing in a given zone, all abnormalities, regardless of type, must be repaired before assembly by a station in a subsequent zone. Thus, if the inspection device 32c communicates that an abnormality is present or the transceiver 36c reads from the first RFID tag 28 that the article 22 has an abnormality detected earlier in the assembly process, the article 22 is only eligible for the assembly operation if at least the abnormality is repaired prior to the assembly operation. Controller 34c is configured to determine if the article 22 is eligible for assembly operation by station 20d and selectively provide an output if the article 22 is eligible that can be used to control the article's conveyance to station 20d. If the article 22 is eligible for assembly by station 20d, the controller 34c will provide the output to the conveyor. Upon receiving the output from the controller 34c, the conveyor will deliver the article 22 from the station 20c to the subsequent station 20d, at which point performance of the assembly operation on the article 22 may begin. However, if the article 22 is not eligible for performance of the assembly operation by station 20d, the controller 34c will not provide the output and the article 22 will not be conveyed to the subsequent station 20d. Instead, the article 22 will remain at station 20c for a technician to repair the abnormality.

It should be understood that although each station 20a-f in the present example has a separate controller 34a-f that determines the article's eligibility for a given assembly operation, a single controller may be provided that determines the article's eligibility for assembly operations at every station 20a-f and provides a plurality of selective outputs based respectively on the article's eligibility for each assembly operation. Moreover, a single controller may be provided within each zone that determines the article's eligibility for assembly operations at stations within that zone. Additionally, there may be a single inspection device, override device, or transceiver for a plurality of work stations. Each work station 20a-f does need not need to comprise a separate inspection device 32a-f, controller 34a-f, transceiver 36a-f, and user interface 38a-f to be within the scope of the application.

The present exemplary system 10 is configured such that any communicated abnormalities in the article 22 must be repaired before leaving a zone, regardless of whether the abnormalities are Type I or Type II abnormalities. However, repair of the abnormalities need not be required for the article 22 to transfer between stations within a zone. In this manner, the article 22 can be processed within a zone without excessive interruption. Moreover, repair of the abnormalities can be executed at the end of each zone rather than at multiple locations within each zone, simplifying the process and reducing the need for multiple repair stations within each zone.

Figure 2:
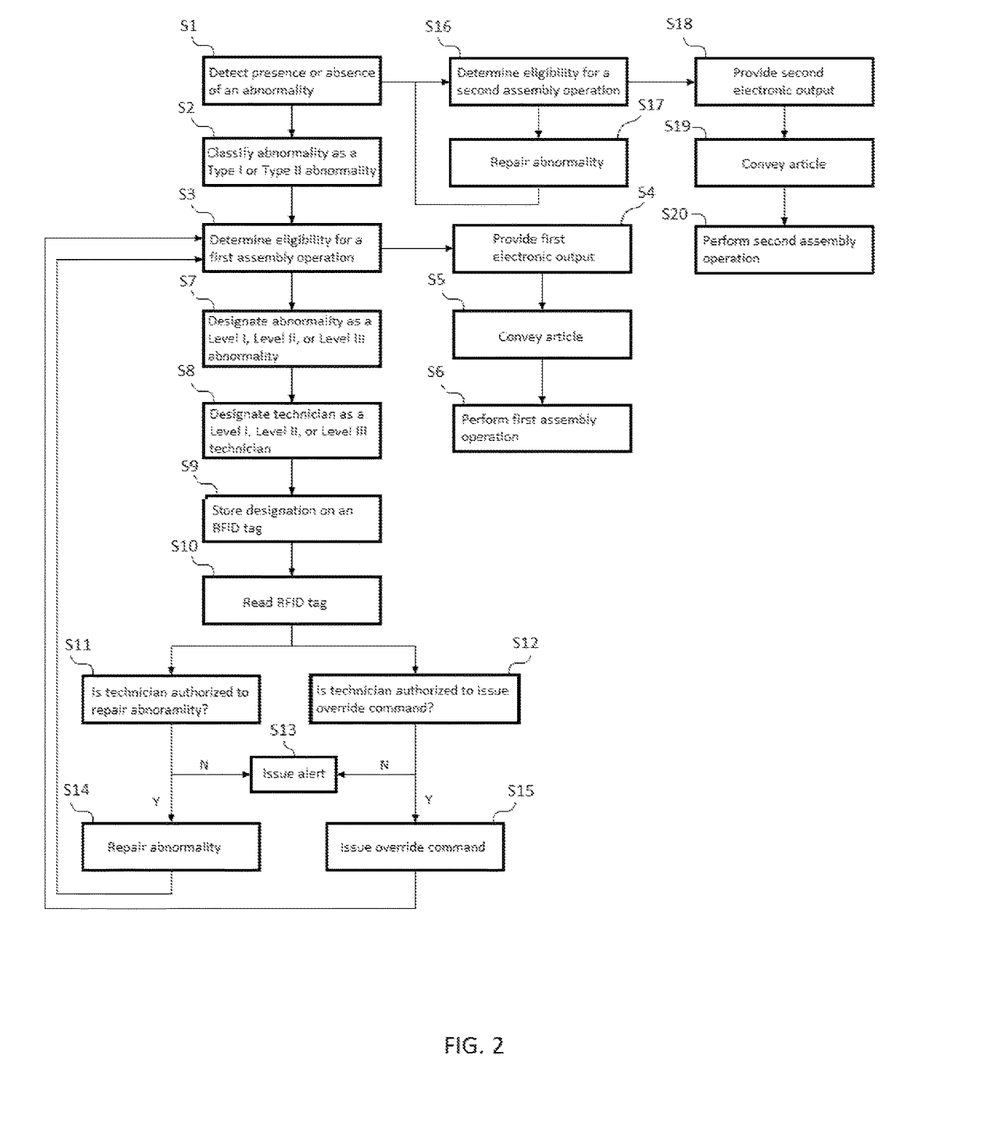
FIG. 2 is a schematic flow diagram of an assembly line process according to an embodiment.

Referring now to FIG. 2, a method will now be described of operating the above assembly line system 10. The method includes the step S1 of detecting the absence or presence of an abnormality in the article 22. For example, an abnormality may be detected present by a torque sensor of the inspection device 32a. The method further includes the step S2 of classifying the abnormality as being one of a plurality of types including a Type I abnormality or a Type II abnormality. Moreover, the method includes the step S3 of determining if the article 22 is eligible for a first assembly operation. For example, if an abnormality is detected as present by the inspection device 32a of station 20a, the article 22 is at least eligible for the first assembly operation of station 20b if at least the abnormality is a Type I abnormality. Moreover, if the abnormality is detected as present and the abnormality is a Type II abnormality, the article 22 is at least eligible for the first assembly operation if at least an override command is received. Furthermore, if the abnormality is detected as present and the abnormality is a Type II abnormality, the article 22 is at least eligible for the first assembly operation if at least the abnormality is repaired.

A first electronic output is provided at step S4 if the article is eligible for the first assembly operation. For example, if the controller 34a determines that the article 22 is eligible for an assembly operation by station 20b, an output may be provided to the conveyor of the assembly line 24. In response, at step S5 the conveyor will convey the article 22 to station 20b for assembly. Once received by the station 20b, at step S6 assembly operation will be performed on the article 22.

The method can further include the step S7 of classifying the abnormality as being one of a plurality of abnormality levels including a Level I, Level II, or Level III abnormality. Moreover, the method can include the step S8 of designating a technician as being one of a plurality of technician levels including a Level I, Level II, or Level III technician. The method can further include the step S9 of storing information on the second RFID tag 42 or other storage medium indicating the technician's identity and designation as a Level I, Level II, or Level III technician.

If an abnormality is detected as present, the method can include the step S14 of repairing the abnormality or the step S15 of providing an override command authorizing performance of the first assembly operation without first repairing the abnormality. As a technician approaches the system 10 to repair the abnormality or issue the override command, the second RFID tag 42 can be read at step S10 by the transceiver 36a-f of the station 20a-f where the article 22 is present. For example, if the article 22 is located at station 20a, the transceiver 36a can read the second RFID tag 42 to determine the identity and authorization level of the technician. At steps S11 and S12 the controller 34a compares the information read from the second RFID tag 42 with the abnormality level determined by the inspection device 32a. If the comparison indicates that the technician is not authorized to repair the abnormality or issue an override command, for example the technician is a Level I technician and the abnormality is a Level II abnormality, the method can comprise the step S13 of providing an alert.

Under the method described above, if an abnormality detected by the inspection device 32a is classified as a Type I abnormality, the assembly operation of station 20b can be performed without first repairing the abnormality. Moreover, if the abnormality is classified as a Type II abnormality and an override command is received by the controller 34a, the assembly operation can be performed without first repairing the abnormality. Additionally, the assembly operation can be performed if the abnormality is classified as a Type II abnormality and the abnormality is repaired.

The method can further comprise the step S16 of determining whether the article 22 is eligible for a second assembly operation. The second assembly operation can be subsequent to the first assembly operation. For example, if the inspection device 32c of station 20c communicates an abnormality or the transceiver 36c reads from the first RFID tag 28 that the article 22 has an abnormality communicated earlier in the assembly process, the article 22 is not eligible for assembly by station 20d unless the abnormality is repaired prior to the assembly operation, regardless of whether the abnormality is a Type I abnormality or a Type II abnormality.

If an abnormality is detected, the method can comprise the step S17 of repairing the abnormality, at which point the article can be eligible for the second assembly operation. Additionally, a second electronic output may be provided at step S18 that is based on the determination of the article's eligibility for the second assembly operation. For example, controller 34c is configured to selectively provide an output based on the article's eligibility for assembly operation by station 20d. In response, at step S19 the conveyor will convey the article 22 to station 20d for assembly. Once received by the station 20d, at step S20 the assembly operation will be performed Many other example embodiments can be provided through various combinations of the above described features. Although the embodiments described hereinabove use specific examples and alternatives, it will be understood by those skilled in the art that various additional alternatives may be used and equivalents may be substituted for elements and/or steps described herein, without necessarily deviating from the intended scope of the application. Modifications may be necessary to adapt the embodiments to a particular situation or to particular needs without departing from the intended scope of the application. It is intended that the application not be limited to the particular implementations and example embodiments described herein, but that the claims be given their broadest reasonable interpretation to cover all novel and non-obvious embodiments, literal or equivalent, disclosed or not, covered thereby.

What is claimed is:

1. A method of operating an assembly line for performing an assembly operation on an article using an inspection device, a controller, and a transceiver, the method comprising:

moving at least one article to at least one of a plurality of inspection stations;

identifying the article using the transceiver, wherein the transceiver identifies the article by reading a first radio frequency identification tag associated with the article, wherein the first radio frequency identification tag comprises a memory storage device configured to store information regarding:

the identity of the article, and an absence or presence of one or more previously-identified abnormalities; and detecting an absence or presence of an abnormality in the article using the inspection device, wherein, if the abnormality is detected as present, the controller classifies the abnormality as one of a plurality of types of abnormalities based at least on information received from the inspection device, wherein the classification of the abnormality includes a first type of abnormality and a second type of abnormality, wherein the classification further comprises designating the abnormality as one abnormality level of a plurality of abnormality levels;

determining that the article is eligible for the assembly operation if at least the abnormality is detected as present, the abnormality is the second type of abnormality, and an override command authorizing performance of the assembly operation without first repairing the abnormality is received by the controller from an override device operated by a technician, wherein the technician is associated with a second radio frequency identification tag indicating an identity of the technician and an authorization level designation corresponding to one of the plurality of abnormality levels;

reading the second radio frequency identification tag to determine the identity and authorization level of the technician; and allowing the override command if the authorization level of the technician is greater than or equal to the one abnormality level, wherein the transceiver updates the at least one identifier with information regarding the presence or absence of the abnormality; the controller provides an electronic output in response to determining that the article is eligible for further assembly; and the article is conveyed along the assembly line for performing the assembly operation in response to the electronic output.

2. The method of claim 1, wherein the override command is received by the controller because the abnormality is repaired.

3. The method of claim 1, further comprising using information received from the inspection device to classify the abnormality as being one of a plurality of abnormality levels including a first level abnormality and a second level abnormality, and wherein the transceiver further updates the first radio frequency identification tag based on the classification.

4. The method of claim 3, further comprising designating a technician as one of a plurality of technician levels including a first level technician and a second level technician, wherein the first level technician is authorized to repair the first level abnormality and not authorized to repair the second level abnormality, wherein the second level technician is authorized to repair at least the second level abnormality.

5. The method of claim 4, wherein the transceiver further updates the first radio frequency identification tag with information indicating the technician level of the technician.

6. The method of claim 5, further comprising reading the information on the first radio frequency identification tag and providing an alert if the information read from the at least one identifier indicates that the technician is not authorized to repair the abnormality.

7. The method of claim 1, wherein upon condition that the abnormality is classified as the second type of abnormality and the override command is received by the controller, the method further comprises a step of performing the assembly operation without repairing the abnormality before performing the assembly operation.

8. The method of claim 1, wherein upon condition that the abnormality is classified as the second type of abnormality and the abnormality is repaired, the method further comprises a step of performing the assembly operation.

9. The method of claim 1, further comprising determining whether the article is eligible for a second assembly operation, wherein the controller provides a second electronic output, based on the determination that the article is eligible for the second assembly operation, wherein the second electric output is provided upon the condition that the abnormality is detected as present and the abnormality is repaired prior to the second assembly operation.

10. An assembly line system for performing an assembly operation on an article, the system comprising:
  a transceiver for outputting a signal identifying the article, wherein the transceiver reads at least a first radio frequency identification tag associated with the article and outputs a signal to a controller, wherein the first radio frequency identification tag comprises a memory storage device configured to store information regarding:
    the identity of the article, and
    an absence or presence of one or more previously-identified abnormalities; and;
  an inspection device configured to communicate a presence or absence of an abnormality in the article to the controller, wherein if an abnormality is detected as present, the controller classifies the abnormality as being one of a plurality of types of abnormalities including a first type of abnormality and a second type of abnormality and designates the abnormality as one abnormality level of a plurality of abnormality levels based on the communication of the inspection device, the controller being configured to selectively provide an output if the controller determines that the article is eligible for the assembly operation based on at least the communication of the inspection device; and
  an override device in communication with the controller and configured to selectively send an override command authorizing performance of the assembly operation to the controller in response to the communication of the inspection device,
  wherein the override device is operated by a technician that is associated with a second radio frequency identification tag indicating an identity of the technician and an authorization level designation corresponding to one of the plurality of abnormality levels,
  wherein upon condition that the abnormality is communicated as present and the abnormality is the second type of abnormality, the controller is configured to determine that the article is eligible for the assembly operation if the controller receives the override command and the authorization level of the technician is greater than or equal to the one abnormality level, and
  wherein the transceiver is configured to update the first radio frequency identification tag with information regarding the presence or absence of the abnormality.

11. The system of claim 10, wherein upon condition that the abnormality is communicated as present and the abnormality is the second type of abnormality, the controller is configured to determine that the article is eligible for the assembly operation if the override command indicates that the abnormality is repaired.

12. The system of claim 10, wherein the controller comprises a delay configured to delay the output upon condition that the inspection device communicates that the abnormality is present and the abnormality is the first type of abnormality.

13. The system of claim 10, further comprising a machine in communication with the controller, the machine being configured to perform the assembly operation on the article upon receiving the output from the controller indicating that the article is eligible for the assembly operation.

14. The system of claim 10, further comprising a station configured to perform the assembly operation and a conveyor in communication with the controller, the conveyor being configured to deliver the article to the station upon receiving the output from the controller indicating that the article is eligible for the assembly operation.

15. The system of claim 10, wherein the plurality of abnormality levels includes a first level abnormality and a second level abnormality.

16. The system of claim 15, wherein the first radio frequency identification tag is configured to store information indicating a designation of the technician as one of a plurality of technician levels including a first level technician and a second level technician, wherein the first level technician is authorized to repair the first level abnormality and not authorized to repair the second level abnormality, further wherein the second level technician is authorized to repair the second level abnormality.

17. The system of claim 16, wherein the controller is configured to issue an alert upon the condition that the information read by the transceiver from the first radio frequency identification tag does not indicate that the technician is authorized to repair the abnormality.

18. The system of claim 10, further comprising a second controller configured to selectively provide a second output indicating that the controller has determined that the article is eligible for a second assembly operation, wherein the second output is provided upon the condition that the abnormality is communicated as present and the abnormality is repaired prior to the second assembly operation.

19. An assembly line system for performing an assembly operation on an article, the system comprising:

a reading device for outputting a signal identifying the article, wherein the reading device reads a first radio frequency identification tag associated with the article and outputs a signal to a controller, wherein the first radio frequency identification tag comprises a memory storage device configured to store information regarding:

the identity of the article, and an absence or presence of one or more previously-identified abnormalities; and;

a plurality of work stations comprising a first work station and a second work station, the second work station configured to perform the assembly operation, the first work station comprising an inspection device in signal communication with the controller, the inspection device configured to communicate a presence or absence of an abnormality in the article to a controller, the abnormality being one of a plurality of types including a first type of abnormality and a second type of abnormality and one abnormality level of a plurality of abnormality levels, the controller being configured to selectively provide an output if the controller determines that the article is eligible for the assembly operation based on at least information received from the inspection device; and an override device in communication with the controller and configured to selectively send an override command authorizing performance of the assembly operation to the controller in response to the communication of the inspection device, wherein the override device is operated by a technician that is associated with a second radio frequency identification tag indicating an identity of the technician and an authorization level designation corresponding to one of the plurality of abnormality levels, wherein upon condition that the abnormality is communicated as present and the abnormality is the second type of abnormality, the controller is configured to determine that the article is eligible for the assembly operation if at least the controller receives the override command and the authorization level of the technician is greater than or equal to the one abnormality level, and wherein the transceiver updates the first radio frequency identification tag with information regarding the presence or absence of the abnormality.

\* \* \* \* \*